Aug. 15, 1961 W. G. MacMILLAN 2,996,109
TIRE BUFFING MACHINE
Filed May 13, 1958 2 Sheets-Sheet 1

INVENTOR
WM. G. Mac MILLAN
BY
*A. Yates Dowell*
ATTORNEY

Aug. 15, 1961 W. G. MacMILLAN 2,996,109
TIRE BUFFING MACHINE
Filed May 13, 1958 2 Sheets-Sheet 2
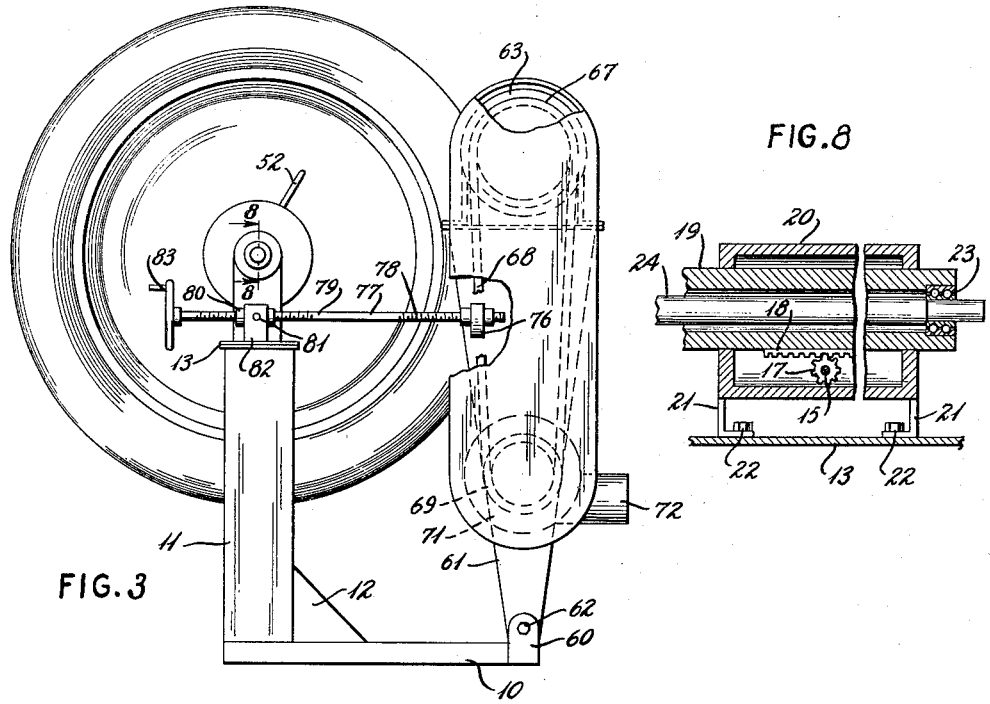
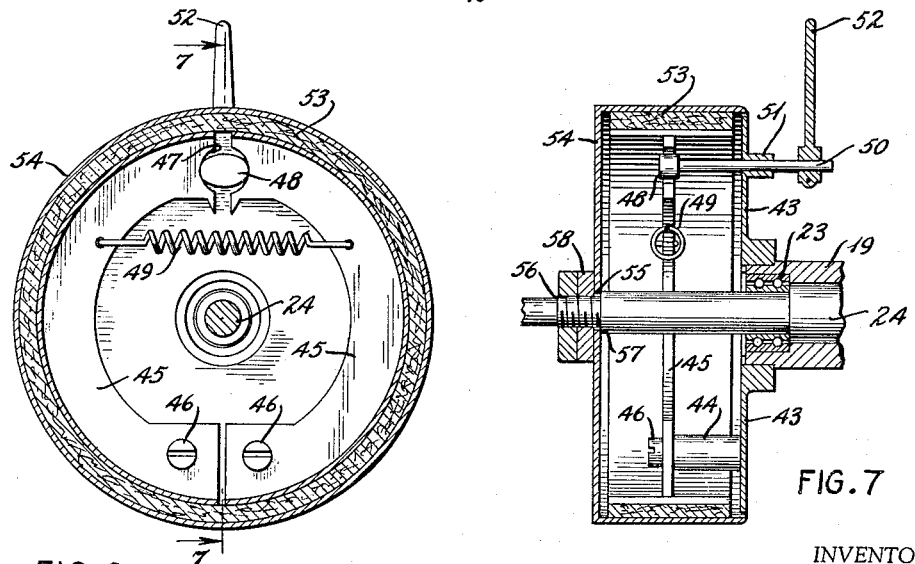
INVENTOR
WM. G. Mac MILLAN
BY
ATTORNEY

United States Patent Office 2,996,109
Patented Aug. 15, 1961

2,996,109
TIRE BUFFING MACHINE
William G. MacMillan, 212 Roycrest Drive, Macon, Ga., assignor of one-half to James D. McMurray, Macon, Ga.
Filed May 13, 1958, Ser. No. 734,812
4 Claims. (Cl. 157—13)

This invention relates to pneumatic tires, to the repair and retreading of the same, and to the equipment employed in the production, repair and retreading of such tires.

The invention is concerned particularly with the preparation of a pneumatic tire for retreading or the preparation of the surface of the tire for the application of additional rubber thereto in order to extend the life and increase the usefulness and safety characteristics of the tire.

The removal of excess rubber from the tread of a pneumatic tire preparatory to repairing or retreading the same has been slow, laborious and lacking in uniformity and thoroughness. This has been due in part to the work being done by hand, however, attempts have been made to provide machinery to simplify such operation. These attempts have met with little success because the rasp wheels or bands were cylindrical or flat and failed to conform to the contour of the surface of the tire and it has been necessary to complete the work by hand.

It is an object of the invention to overcome the difficulties enumerated and to provide a tire buffing machine of simple, inexpensive, and compact construction, which is economical to operate and maintain, and which will buff not only the top but sides of the tire.

Another object of the invention is to provide mechanism for accurately, rapidly, and economically buffing a tire and employing a rasp curved to the contour of the tire being buffed and of a character to accommodate tires of different sizes and thicknesses.

Another object of the invention is to provide tire buffing mechanism having lateral and diametrical control as well as adjustable width mounting with a calibrated scale for accurately controlling and determining the width of the tire and the utilization of air pressure within the tire for facilitating the buffing process.

A further object of the invention is to provide a tire buffing machine capable of removing an equal amount of rubber from the surface of the tire, which will accommodate tubeless as well as tires having tubes, and will control the speed of rotation of the tire and the lateral adjustment of the tire and wheel assembly.

Figure 1:
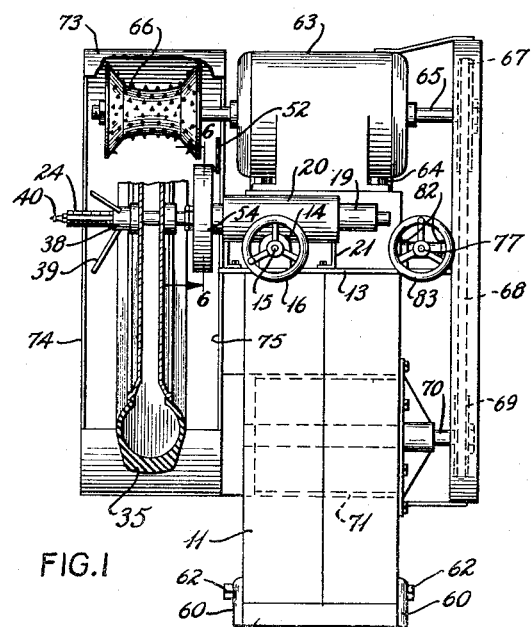
Figure 4:
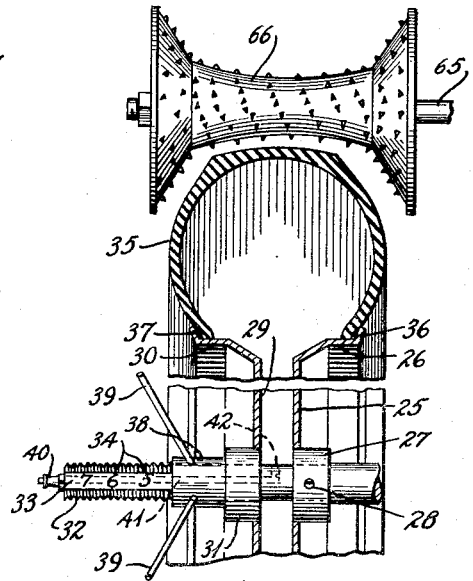
Figure 2:
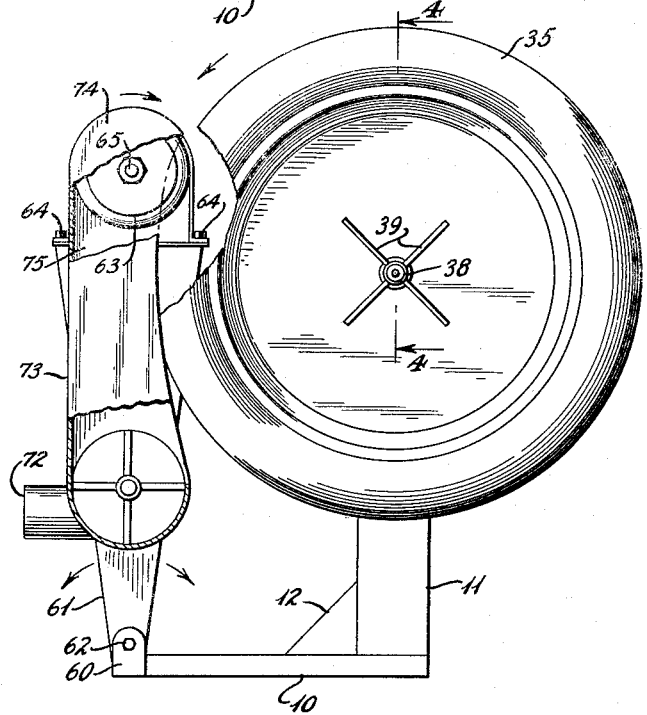
Figure 5:
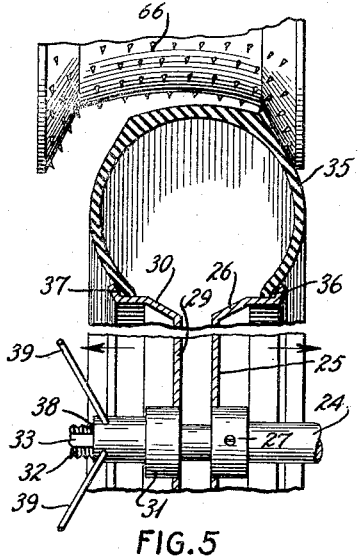

Other objects and advantages of the invention will be apparent from the following description taken in conjunction with the accompanying drawings wherein:

FIG. 1 is a front elevation, with parts broken away, illustrating one embodiment of the invention;
FIG. 2, a left side elevation of FIG. 1 with parts broken away;
FIG. 3, a right side elevation of FIG. 1 with parts broken away;
FIG. 4, an enlarged fragmentary section on the line 4—4 of FIG. 2;
FIG. 5, a view similar to FIG. 4 illustrating the manner in which the sides of the tire or casing are buffed;
FIG. 6, an enlarged detail section on the line 6—6 of FIG. 1;
FIG. 7, a section on the line 7—7 of FIG. 6; and
FIG. 8, a section on the line 8—8 of FIG. 3.

Briefly stated the invention comprises a tire buffing machine having a base on the upper end of which is mounted an arbor or shaft and with mechanism for moving the arbor endwise. On such arbor are mounted a pair of adjustable plates having flanges at their outer edges which receive a tire.

Intermediate the adjustable plates and the frame is mounted a tire revolution speed control. The outer end of the arbor or shaft preferably is threaded and may have a flattened portion with indicia thereon in the form of a graduated scale. Means is provided to introduce air under pressure between the adjustable plates to maintain air pressure in the tire during the buffing operation. On the frame is pivotally mounted a substantially U-shaped member which supports a motor, the shaft of which carries a contour rasp. A pulley may be mounted on the opposite end of such shaft to drive a blower for disposing of the rubber particles removed from the tire.

With continued reference to the drawings, the tire buffing machine of the present invention comprises an L-shaped frame having a base 10 and an upright leg 11 reinforced by brackets 12. A mounting plate 13 may be secured to the top of the upright leg 11 and may have mounted thereon a bracket 14 which supports shaft 15 adapted to be rotated by handwheel 16.

The shaft 15 desirably may have pinion gear 17 mounted thereon in cooperative engagement with rack 18 carried by a generally square hollow member 19 which may be slidably supported by a housing 20. Such housing may be provided with L-shaped legs 21 and mounted on plate 13 by bolts and nuts 22.

The member 19 may have bearings 23 at each end which support a rotatable arbor 24. A plate or disk 25' has a flange 26 and a hub 27 fixed to the arbor 24 by means of a set screw 28. The plate 29 having a flange 30 and a hub 31 may be slidable on the arbor 24 in adjustable cooperative relation with plate 25.

The outer end of the arbor 24 may be provided with external screw threads 32 having a flattened portion 33 provided with indicia 34 corresponding to the size of tire or casing 35. The flanges 26 and 30 may be provided with gasket rings 36 and 37, one on each of the flanges 26 and 30 for making a complete seal with the tire.

A lock nut 38 may be provided with opening members or levers 39 and such nut may be in cooperative engagement with the threads 32 on the shaft or arbor 24 and may bear against the hub 31 to provide for adjustment of the plate 29 for various sizes of tires.

Air under pressure may be introduced into the tire 35 by means of a fitting 40 and an air passageway 41 in the end of the arbor 24 and opening 42 therein intermediate the plates 25 and 29.

A tire revolution speed control is mounted between the housing 20 and the plate 25 with a backing plate 43 on one end of the member 19. The lower side of the plate 43 may have a pair of posts 44 on which a pair of brake shoes 45 are mounted by means of anchor pins 46. The upper ends of the brake shoes 45 are provided with cam surfaces 47 which preferably may be urged into engagement with a cam 48 by a spring 49. The cam 48 is mounted on the end of a shaft 50 rotatable in a bearing 51 on the plate 43 and may have an operating handle 52 mounted on the outer end thereof to cause rotation of the cam 48.

In the operation the cam 48 shown in tire locking position in FIGS. 6 and 7 may be rotated either to the right or to the left to cause the brake shoes 45 to contract and move inwardly from engagement with the brake lining 53 on brake drum 54. The brake drum 54 may be provided with an opening 55 of a sufficient size to freely receive the threaded portion 56 of the arbor 24 and bear against a shoulder 57 on such arbor where it may be held in fixed relation thereto by jam nuts 58 in a manner to cause the brake drum 54 to rotate with the arbor 24.

The end of the base 10 opposite the upright leg 11 may be provided with spaced lugs 60, one on each side thereof, to which is connected a motor supporting frame 61, of substantially U-shape construction, by means of a pivot 62. A motor 63 may be mounted on the frame 61 in any desired manner as by bolts 64 and may be provided with a double ended shaft 65 having a contour rasp 66 mounted on one end thereof and a pulley 67 mounted on the shaft on the opposite side of the motor. Pulley 67 is connected to drive belt 68 which drives pulley 69 attached to shaft 70 of fan 71 having an exhaust passage or outlet 72.

A contour rasp 66 is provided which may have a housing 73 over the top and rear of such rasp and said housing may extend downwardly and may have an inwardly curved semi-circular bottom with side plates 74 and 75 which form a collector for rubber particles or filings so that such filings may be removed from the machine by the fan 71.

In order to bring the rasp into contact with the tire, a lug 76 may be pivotally mounted on the side of motor frame 61 and such lug may be threadedly engaged with shaft 77 having for example right hand treads 78. The opposite end of the shaft 77 may have left hand treads 79 in engagement with a bushing 80 pivotally connected by pins 81 to a pair of ears 82 on the plate 13. The shaft 77 is adapted to be rotated by a hand wheel 83 mounted on one end thereof or in any other desired manner.

In operation the tire or casing to be buffed may be mounted on the flanges 26 and 30 of the plates or disks 25 and 29 and the lock nut 38 adjusted to the proper spacing for the individual tire and then air under pressure introduced into the tire.

The plates 25 and 29 may be adjusted axially relative to each other to accommodate different sizes of tires as for example automobile, light and medium truck tires. When the motor 63 is energized the rasp 66 will turn and the fan 71 will be operated by the belt 68 and the pulleys 67 and 69. The tire revolution speed control unit of FIGS. 6 and 7 may be unlocked and moved to a position to allow the tire casing to revolve freely.

In order to bring the rasp 66 into contact with the tire, the handwheel 83 may be operated to swing the rasp through an arc around the pivot 62. The mounted tire is adapted to be adjusted axially by means of hand wheel 16 to buff the tread of the tire and the side walls thereof. The tire casing will be rotated by the rasp when in contact with the latter, and in order to provide adequate frictional engagement rotation of the tire may be retarded by the moving of the handle 52 of the tire revolution speed control to bring the brake shoes 45 into contact with brake lining 53.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A tire buffing machine for obtaining accurate contours of tires of varying diameters and varying cross-sections comprising a base, an upright leg fixedly mounted on said base, a mounting plate fixed to the upper end of said upright leg, a housing fixedly mounted on said plate, a square hollow member slidably mounted in said housing, a rack fixed to said slidable member, a pinion meshing with said rack, a shaft extending transversely of the direction of sliding movement of said hollow member and carrying said pinion, a hand wheel for operating said shaft whereby said hollow member may be accurately moved relative to said housing, a wheel supporting shaft rotatably mounted in said hollow member and projecting outwardly from one end thereof, a brake drum fixed to said shaft, a brake supporting plate fixed on said hollow member, brake shoes mounted on said plate, means connected to said brake shoes and extending outwardly of said plate for pressing said brake shoes against said drum, a first disk fixedly mounted on said shaft and having a tire bead engaging flange thereon, a second disk adjustably mounted on said shaft and having a bead engaging flange thereon whereby said first and second disks may secure a tire in fixed relation to said shaft, means to conduct air from the end of said shaft into the space between said disks and into a tire supported thereon whereby a tire can be inflated and assume its natural shape, a supporting frame pivotally mounted on said base for movement about an axis parallel to the axis of said shaft, a motor mounted on the upper end of said supporting frame and having its shaft extending outwardly in both directions substantially parallel to said first shaft and said pivot, a contour rasp for accommodating the widest cross-section of a tire fixedly mounted on one end of said motor shaft, a blower having a driving pulley mounted on said pivoted supporting frame, a pulley on the other end of said motor shaft, and a belt connecting said motor pulley and said pulley on said blower for operating said blower when said motor is operated, and a deflector on said pivoted supporting frame surrounding a major portion of said rasp and communicating with said blower for confining the cut away material.

2. A tire buffing machine for obtaining accurate contours of tires comprising a base, an upright mounted on said base, a housing fixedly mounted on the upper end of said upright, a hollow member slidably mounted in said housing, a rack fixed to said slidable member, a pinion meshing with said rack, a shaft extending transversely of the direction of sliding movement of said hollow member and carrying said pinion, a hand wheel for operating said pinion carrying shaft whereby said hollow member may be accurately moved relative to said housing, a tire supporting shaft rotatably mounted in said hollow member and projecting outwardly from one end thereof, a brake drum fixed to said shaft, a brake supporting plate fixed on said hollow member, brake shoes mounted on said plate, means connected to said brake shoes and extending outwardly of said plate for pressing said brake shoes against said drum, a first disk fixedly mounted on said shaft and having a tire bead engaging flange thereon, a second disk adjustably mounted on said shaft and having a bead engaging flange thereon whereby said first and second disks may secure a tire in fixed relation to said shaft, means to conduct air from the end of said shaft into the space between said disks and into a tire supported thereon whereby a tire can be inflated and assume its natural shape, a supporting frame pivotally mounted on said base for movement about an axis parallel to the axis of said tire supporting shaft, a rasp-carrying shaft rotatably mounted on the upper end of said supporting frame, a contour rasp on said rasp-carrying shaft for accommodating the cross-section of a tire mounted on one end of said tire supporting shaft and means to move said rasp toward and away from said tire.

3. A tire buffing machine comprising a base, a fixed support mounted on said base, an axle rotatively mounted on the free end of said support, means to support a tire on said axle for rotation of the tire about the axis of the tire and the axis of said axle, brake means to resist the rotation of said axle and the tire supported thereon, a buffer support pivotally mounted on said base at a point spaced horizontally from said support on an axis substantially parallel to the axis of the axle for supporting a tire, a buffer mounted on said buffer support spaced from said pivotal axis, said buffer being rotatably mounted on an axis fixed with respect to said buffer support and substantially parallel to the axis of said tire supporting axle and pivotal axis of the buffer support, power means for rotating said buffer, means to adjust the position of the buffer relative to the axis of said tire supporting axle radially from said axis of said tire, and means to relatively adjust the position of said tire and buffer in an axial direction of the tire supporting axle and the tire supported thereby whereby the buffer can be accurately positioned to obtain precise buffing on a tire supported on said tire supporting axle.

4. The invention according to claim 3 in which means are provided for inflating the tire to assure proper accurate buffing of the tire.

References Cited in the file of this patent

UNITED STATES PATENTS

| | | | |
|---|---|---|---|
| 602,612 | Bagby | Apr. 19, | 1898 |
| 2,065,448 | George | Dec. 22, | 1936 |
| 2,133,438 | Eger | Oct. 18, | 1938 |
| 2,160,143 | Hayton | May 30, | 1939 |
| 2,200,575 | Haskins | May 14, | 1940 |
| 2,205,939 | Wilson | June 25, | 1940 |
| 2,271,130 | Pearson | Jan. 27, | 1942 |
| 2,366,685 | Chambers | Jan. 2, | 1945 |
| 2,392,667 | Hawkinson | Jan. 8, | 1946 |
| 2,535,281 | Glynn | Dec. 26, | 1950 |
| 2,864,444 | Glodde | Dec. 16, | 1958 |
| 2,888,065 | Neilsen | May 26, | 1959 |
| 2,918,116 | Mooney | Dec. 22, | 1959 |